(12) United States Patent
Naber et al.

(10) Patent No.: US 10,959,438 B2
(45) Date of Patent: Mar. 30, 2021

(54) PRECISION BAKING SYSTEM

(71) Applicant: Haier US Appliance Solutions, Inc., Wilmington, DE (US)

(72) Inventors: Christopher Nils Naber, Louisville, KY (US); Nolyn Lee Steffey, Louisville, KY (US); Ryan Murray Trostle, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 476 days.

(21) Appl. No.: 15/828,537

(22) Filed: Dec. 1, 2017

(65) Prior Publication Data
US 2019/0166851 A1  Jun. 6, 2019

(51) Int. Cl.
*A21B 3/13* (2006.01)
*G01K 1/14* (2021.01)
*G01K 7/00* (2006.01)

(52) U.S. Cl.
CPC .............. *A21B 3/135* (2013.01); *G01K 1/14* (2013.01); *G01K 7/00* (2013.01); *G01K 2207/06* (2013.01); *G01K 2207/08* (2013.01)

(58) Field of Classification Search
CPC ...... A21B 3/135; G01K 1/14; G01K 2207/06; G01K 2207/08
See application file for complete search history.

(56) References Cited

U.S. PATENT DOCUMENTS

| 5,331,575 A | * | 7/1994 | Koether | A21B 5/08 219/441 |
|---|---|---|---|---|
| 5,872,351 A | * | 2/1999 | Sowerby | A21B 1/02 219/621 |
| 6,463,844 B1 | | 10/2002 | Wang et al. | |
| 2002/0181541 A1 | * | 12/2002 | Lee | G01K 1/14 374/141 |
| 2006/0117961 A1 | | 6/2006 | Guo | |
| 2012/0188133 A1 | * | 7/2012 | Sabah | G01K 1/024 343/720 |
| 2014/0098835 A1 | * | 4/2014 | Herzog | G01K 11/265 374/117 |

(Continued)

FOREIGN PATENT DOCUMENTS

WO    WO2015149436 A1    10/2015

OTHER PUBLICATIONS

Josh Valcarcel, Wired, We Put 5 Instant-Read Meat Thermometers to the Test, Published Feb. 23, 2015 (Year: 2015).*

(Continued)

*Primary Examiner* — Moshe Wilensky
*Assistant Examiner* — Kyle A Cook
(74) *Attorney, Agent, or Firm* — Dority & Manning, P.A.

(57) ABSTRACT

A precision baking system includes a baking vessel that defines a vertical direction. The baking vessel includes a base wall and at least one sidewall. An aperture is formed in one of the base wall and the sidewall. The precision baking system also includes a temperature probe. The temperature probe includes a tip and a temperature sensor within the tip. The temperature probe is sized to extend through the aperture such that the tip of the temperature probe is spaced from the base wall and the sidewall of the baking vessel when the temperature probe is fully inserted into the baking vessel through the aperture.

5 Claims, 6 Drawing Sheets

(56) References Cited

U.S. PATENT DOCUMENTS

| | | | |
|---|---|---|---|
| 2014/0137751 A1* | 5/2014 | Bellm | G01K 1/024 99/342 |
| 2015/0076157 A1* | 3/2015 | Rine | A47J 37/01 220/573.1 |
| 2015/0114962 A1* | 4/2015 | Kaiser | F24C 15/10 220/212 |
| 2017/0156547 A1* | 6/2017 | Neumann | F16B 2/10 |
| 2017/0167733 A1* | 6/2017 | Bockler | G01K 13/00 |

OTHER PUBLICATIONS

Wikipedia, Meat Thermometer, https://en.wikipedia.org/wiki/Meat_thermometer, Screenshot captured on May 29, 2016 (Year: 2016).*

\* cited by examiner

PRECISION BAKING SYSTEM

FIELD OF THE INVENTION

The present subject matter relates generally to baking utensils or vessels, and more particularly to a precision baking system including a baking vessel with improved temperature measurement.

BACKGROUND OF THE INVENTION

Traditionally, when preparing baked goods, a user will estimate when the baked goods are done based on cooking temperature and time. In some instances, the user may apply additional methods to see if the baked goods are done, such as inserting a sharp object, e.g., a toothpick, into the baked goods to visually inspect how much of the baked goods sticks to the toothpick. A user may sometimes also use an instant read thermometer to check the internal temperature of the baked goods.

Relying on cooking temperature and time alone can be inaccurate. For example, different cooking appliances may vary in the precision and accuracy with which cooking temperatures can be set and/or measured. Also, measuring cooking temperature only indirectly measures the temperature of the baked goods. Applying additional methods such as the toothpick test or instant read thermometer can be inefficient. For example, opening an oven door while the baking operation is ongoing in order to insert, e.g., the toothpick or thermometer, allows heat from the cooking chamber to escape. Also, reaching into the cooking chamber in such methods may lead to inadvertently touching a hot surface of the cooking chamber or a hot cooking rack.

Accordingly, a baking system with features for accurate and efficient assessment of the doneness of baked goods prepared with the system would be useful.

BRIEF DESCRIPTION OF THE INVENTION

The present invention provides a temperature probe integrated into a baking utensil, e.g., a bread pan or cake pan, to continuously sense the internal temperature of baked goods within the pan during baking. Additional aspects and advantages of the invention will be set forth in part in the following description, or may be apparent from the description, or may be learned through practice of the invention.

In a first exemplary embodiment, precision baking system is provided. The precision baking system includes a baking vessel that defines a vertical direction. The baking vessel includes a base wall and at least one sidewall. An aperture is formed in one of the base wall and the sidewall. The precision baking system also includes a temperature probe. The temperature probe includes a tip and a temperature sensor within the tip. The temperature probe is sized to extend through the aperture such that the tip of the temperature probe is spaced from the base wall and the sidewall of the baking vessel when the temperature probe is fully inserted into the baking vessel through the aperture.

In a second exemplary embodiment, a temperature probe is provided. The temperature probe includes a tip, a temperature sensor within the tip surrounded by a sheath, and a flange spaced from the tip. The flange includes a resilient material. The temperature probe also includes a distal portion distal from the tip and a shaft extending from the flange between the flange and the tip. The shaft includes a resilient material. The temperature probe also includes a cylindrical cap enclosing the distal portion of the temperature probe. Insulating material surrounds the distal portion of the temperature probe within the cylindrical cap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
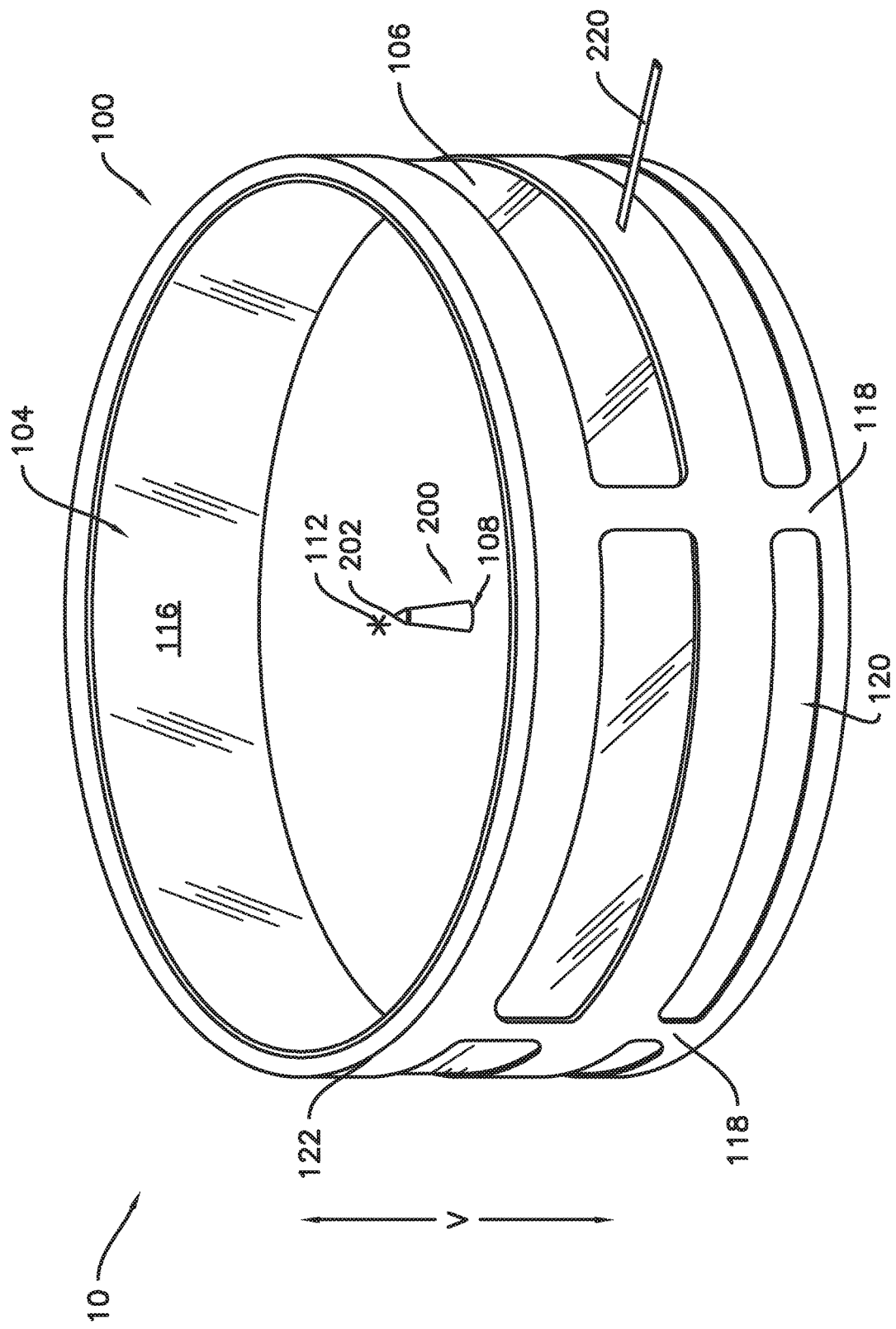
FIG. 1 provides a perspective view of a precision baking system according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
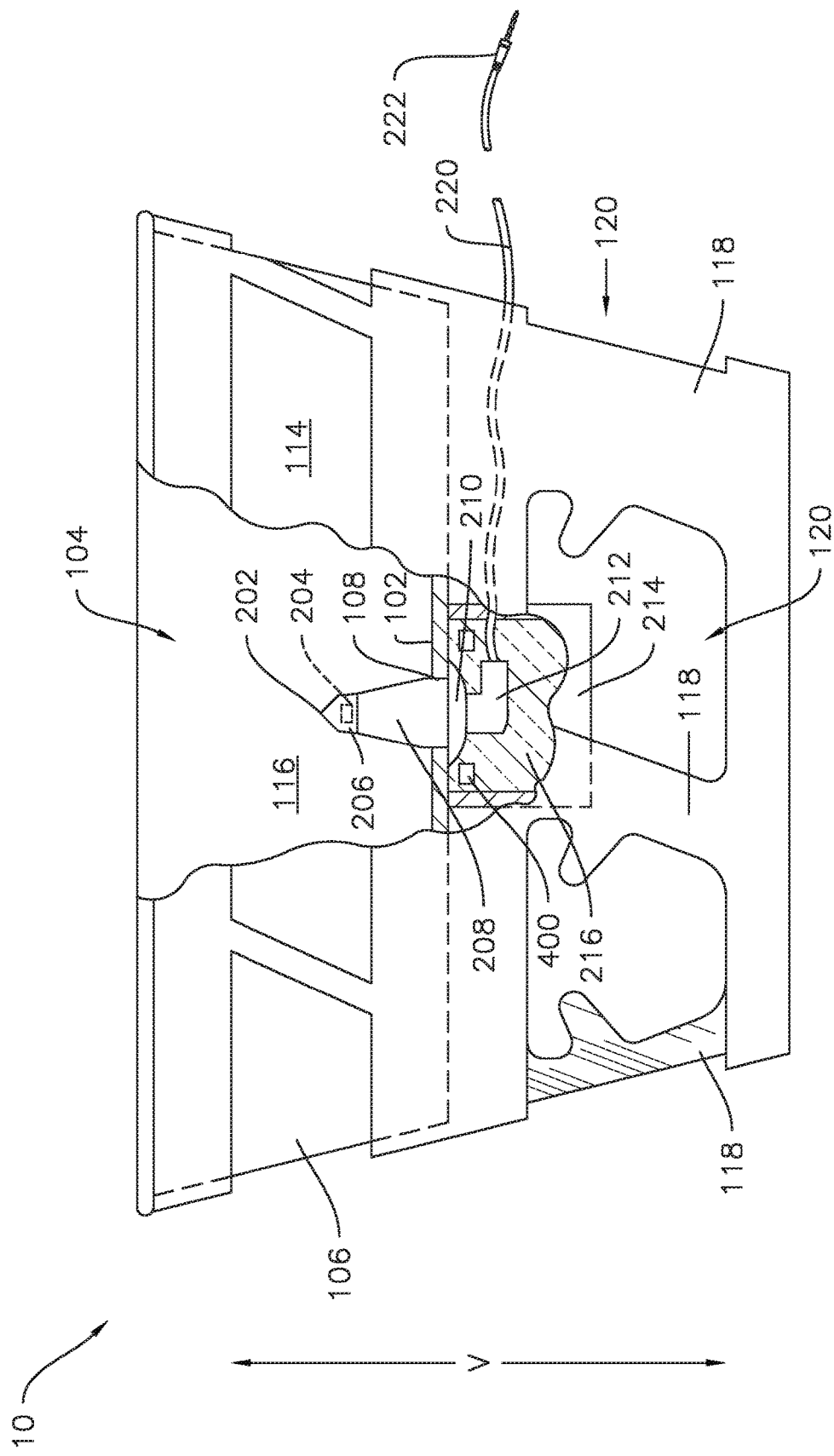
FIG. 2 provides a partially cut away side view of a precision baking system according to one or more embodiments of the present subject matter.

As illustrated in FIGS. 1 through 5, the precision baking system 10 includes a baking utensil or vessel 100, such as a round cake pan as in the illustrated embodiment. The baking vessel 100 defines a vertical direction V. The baking vessel 100 extends between a base wall 102 and an opening 104 along the vertical direction V. At least one sidewall 106 extends between the base wall 102 and the opening 104, and the at least one sidewall 106 may be oriented generally along the vertical direction V, as illustrated for example in FIG. 1. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees either clockwise or counterclockwise with the vertical direction V. In some embodiments, as illustrated in FIG. 2, the at least one sidewall may be oblique to the vertical direction V such that the baking vessel 100 tapers down or narrows from the opening 104 towards the base wall 102. In additional embodiments, the baking vessel 100 may include more than one sidewall 106, e.g., the baking vessel 100 may be square or rectangular with four sidewalls 106.

As illustrated for example in FIGS. 1 and 2, the baking vessel 100 defines a cooking volume 116, e.g., an internal space or volume defined by the base wall 102 and the sidewall 106, into which ingredients or other items to be cooked may be placed through the opening 104. In some embodiments, one example of which is illustrated in FIGS. 1 and 2, the precision baking system 10 may also include a plurality of legs 118 extending generally along the vertical direction V below the cooking volume 116 of the baking vessel 100. Air flow passages 120 may be defined between adjacent legs of the plurality of legs 118. As shown in FIGS. 1 and 2, the legs 118 may be provided as an annular sleeve 122 surrounding the baking vessel 100. The legs 118 may also be integrally formed with the baking vessel 100, e.g., of a unitary and seamless one-piece construction.

Figure 3:
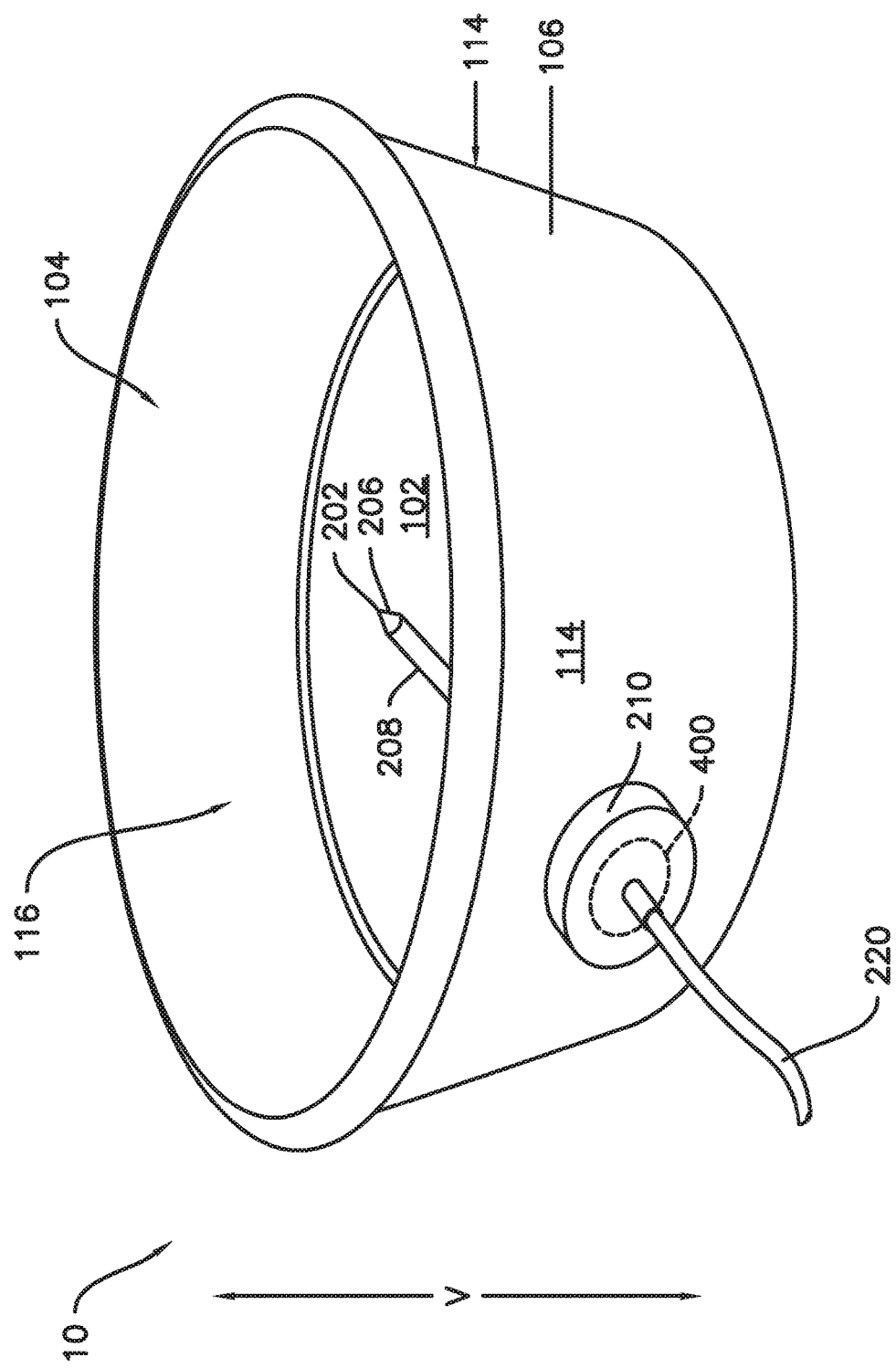
FIG. 3 provides a perspective view of a precision baking system according to one or more embodiments of the present subject matter.
Figure 6:
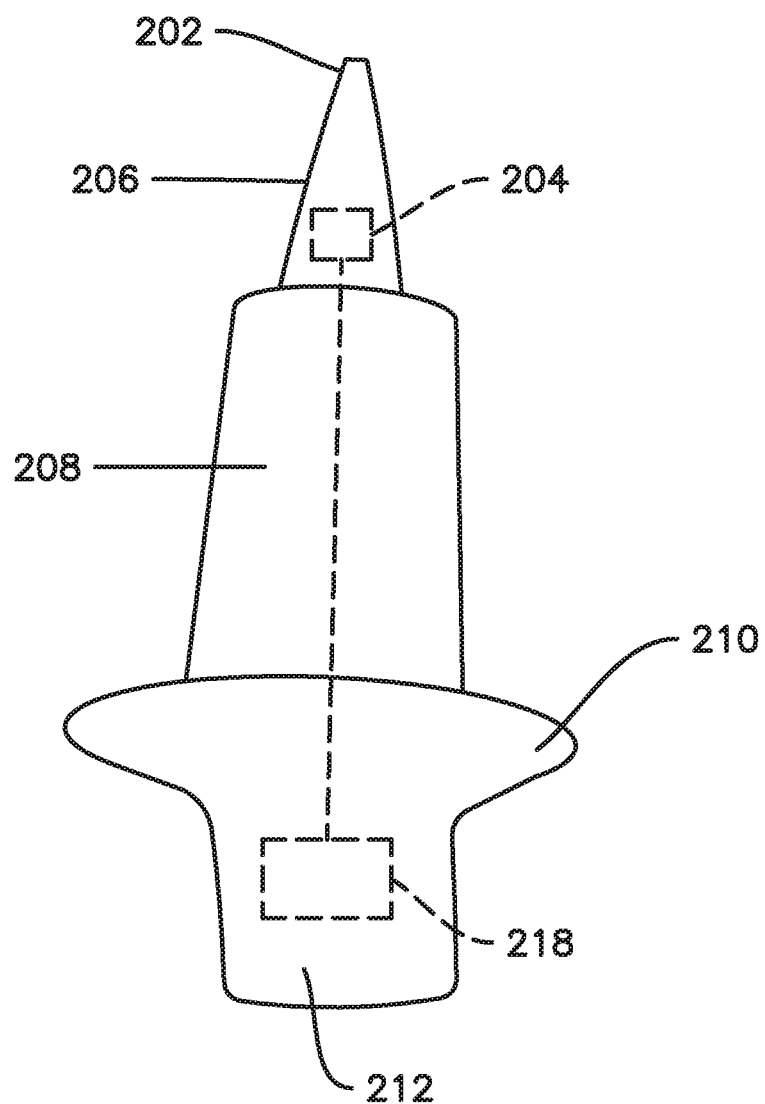
FIG. 6 provides a perspective view of a temperature probe according to one or more embodiments of the present subject matter.

The precision baking system 10 also includes a temperature probe 200. An example of the temperature probe 200 is illustrated in FIG. 6. As illustrated in FIGS. 1 and 3, the temperature probe 200 includes a tip 202 and a temperature sensor 204 within the tip 202. For example, the tip 202 may be defined by a metal sheath 206 surrounding the temperature sensor 204. The sheath 206 may also be any suitable material which provides the desired thermal conductivity for the temperature sensor 204 to measure a temperature of material, e.g., baked goods, in contact with the sheath 206. As shown, for example, in FIGS. 1 and 4, the temperature probe 200 may be positioned within the baking vessel 100 such that the tip 202 of the temperature probe is proximate a geometric center 112 of the baking vessel 100. The temperature probe 200 may also include a distal portion 212 distal from the tip 202 and a cylindrical cap 214 enclosing the distal portion 212 of the temperature probe 200. As shown in FIG. 2, thermally insulating material 216 may be provided surrounding the distal portion 212 of the temperature probe 200 within the cylindrical cap 214.

Figure 5:
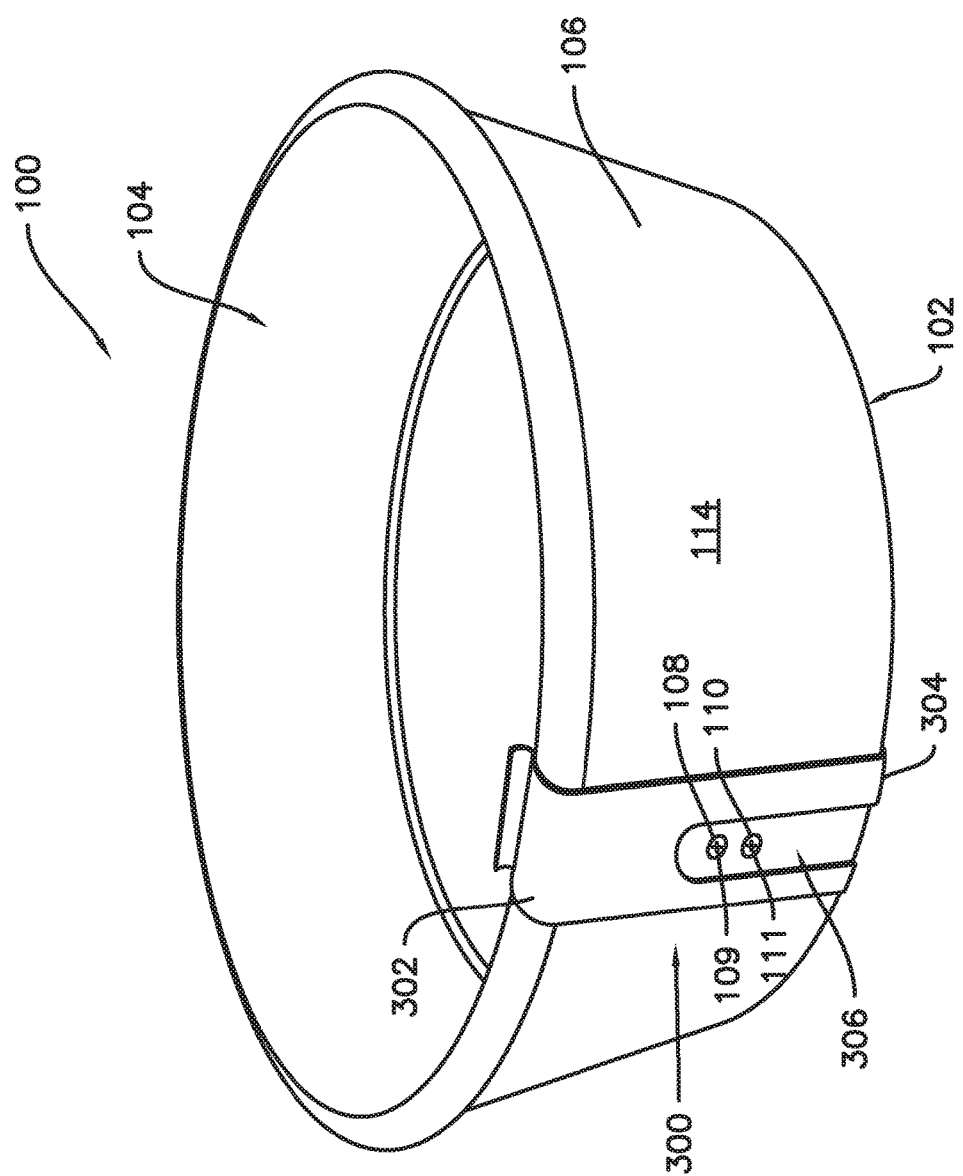
FIG. 5 provides a perspective view of a precision baking system according to one or more embodiments of the present subject matter.

The baking vessel 100 includes an aperture 108 in one of the base wall 102 and the at least one sidewall 106. For example, as illustrated in FIGS. 2 and 3, the aperture 108 may be formed in the base wall 102. In some embodiments, as best seen in FIG. 5, the aperture 108 may be formed in the sidewall 106. The baking vessel 100 may include more than one aperture, such as first aperture 108 and second aperture 110 depicted in FIG. 5. As shown in FIG. 5, the first aperture 108 and second aperture 110 may be provided in the sidewall 106 (or, in embodiments including more than one sidewall, in one of the sidewalls). Additionally, in embodiments where the aperture 108 is formed in the base wall 102, a second aperture 110 may also be provided in the base wall 102.

Figure 4:
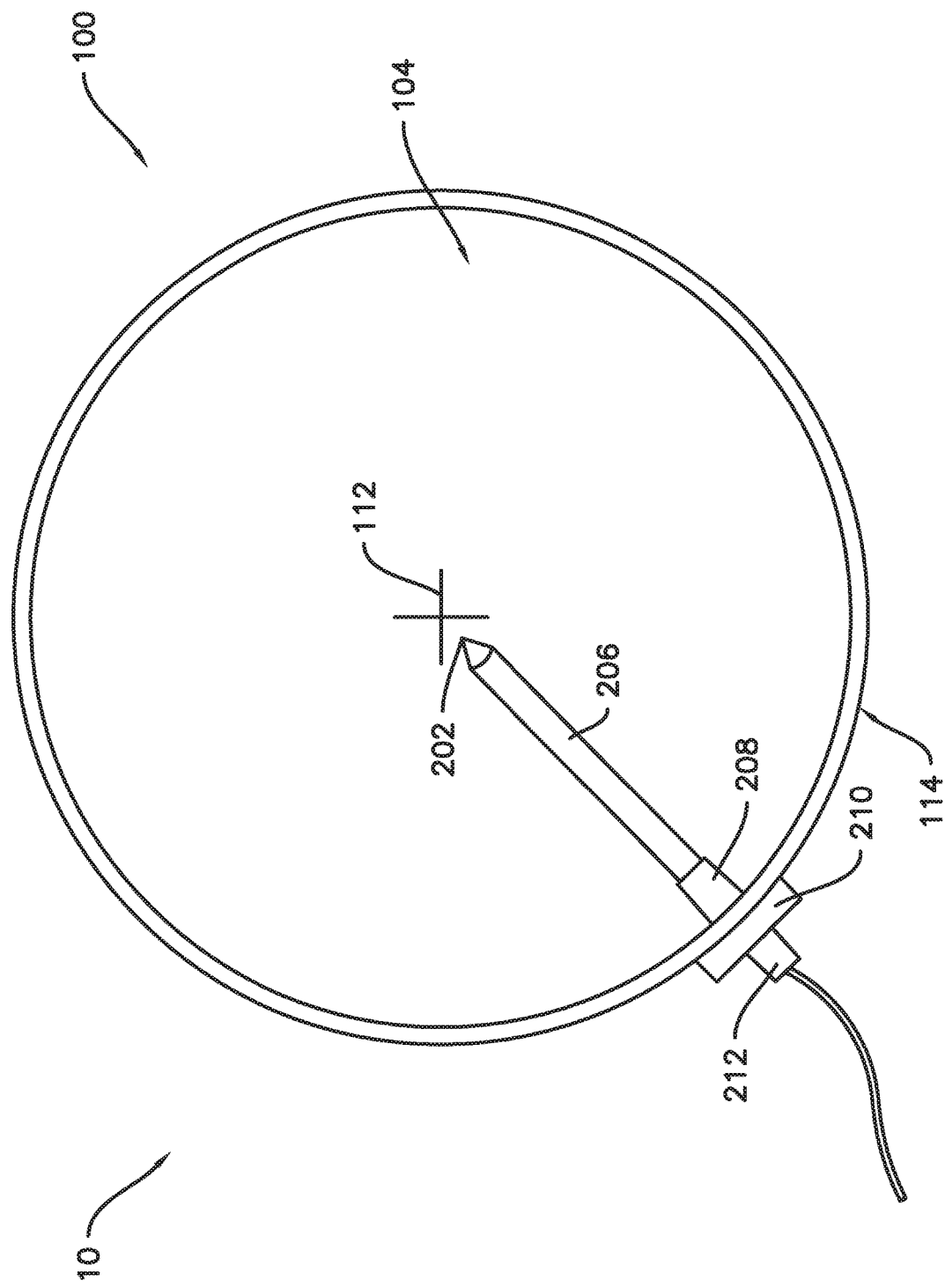
FIG. 4 provides a top view of the precision baking system of FIG. 3.

As shown in FIGS. 1 through 4, the temperature probe 200 may be sized to extend through the aperture 108. In particular, in some embodiments, e.g., as illustrated in FIGS. 1 and 2, the temperature probe 200 may extend through the aperture 108 in the base wall 102. In alternative embodiments, e.g., as illustrated in FIGS. 3 and 4, the temperature probe 200 may extend through the aperture 108 in the sidewall 106. For example, the aperture 108 may be a circular aperture having a diameter, and the temperature probe 200 may likewise include a circular portion, e.g., a shaft 208, having a diameter approximately equal to or slightly less than the diameter of the aperture 108 so that the shaft 208 can pass through the aperture 108. Additionally, the temperature probe 200 may be sized to extend through the aperture 108 such that the tip 202 of the temperature probe 200 is spaced apart from the base wall 102 and the sidewall 106, e.g., by a sufficient distance that temperature measurements made by the temperature probe 200 are not influenced by radiant heat from the base wall 102 or the side wall 106. Accordingly, the temperature probe 200 may more accurately measure the internal temperature of baked goods within the baking vessel 100. For example, in some embodiments, the temperature probe 200 may be at least about two inches (2") from any of the base wall 102 and the sidewall 106 when the temperature probe 200 is fully inserted into the baking vessel 100 through the aperture 108. As another example, the temperature probe 200 may be proximate the geometric center 112 of the baking vessel 100 when the temperature probe 200 is fully inserted into the baking vessel 100 through the aperture 108. For example, the temperature probe 200 may include a flange 210 spaced from the tip 202. The flange 210 may be round, e.g., circular, and may have a major dimension, e.g., diameter, greater than a corresponding dimension, e.g., diameter, of the aperture 108 so that the flange 210 will not pass through the aperture 108. Accordingly, the temperature probe 200 may be sized with respect to the distance between the flange 210 and the tip 202 such that the tip 202 of the temperature probe 200 is proximate the geometric center 112 of the baking vessel 100 when the flange 210 abuts an exterior surface 114 of the baking vessel 100, e.g., when the temperature probe 200 is fully inserted into the baking vessel 100 through the aperture 108.

As used herein, the term "geometric center" may refer to a two-dimensional geometric center or a three-dimensional geometric center of the baking vessel 100. For example, where the baking vessel is generally cylindrical, a geometric center of the baking vessel may be a two-dimensional geometric center, e.g. a center of the circular cross-section of the cylindrical vessel defined at any point along the height of the cylinder. As another example, a geometric center of the cylindrical baking vessel may be a three-dimensional geometric center, e.g. a center of the circular cross-section of the cylindrical vessel at the center of the height of the cylinder. Thus, for example, in embodiments such as is illustrated in FIG. 5 where more than one aperture is provided, the tip 202 of the temperature probe 200 may be proximate at least a two-dimensional geometric center of the baking vessel 100, e.g., the center of the circular cross-section of the round baking vessel as illustrated in FIG. 4, when the temperature probe 200 is fully inserted through either of the apertures 108 or 110.

In embodiments where a first aperture 108 and a second aperture 110 are provided, e.g., as illustrated in FIG. 5, the first aperture 108 and the second aperture 110 are preferably aligned in one direction and offset in another direction. For example, the apertures 108, 110 may be offset along the vertical direction V whereby the higher aperture may be used when the baking pan is full and the lower aperture may be used when baking a smaller baked good. For example, where the first and second apertures 108, 110 are formed in the sidewall 106 as illustrated in FIG. 5, the second aperture 110 may be spaced apart from the first aperture 108 along the vertical direction V, while a center point 111 of the second aperture 110 is aligned with a center point 109 of the first aperture 108. Thus, the temperature probe 200 may be positioned with the tip 202 proximate at least a two-dimensional geometric center of the baking vessel 100 when the temperature probe 200 is fully inserted through either of the apertures 108 or 110.

As mentioned above, the temperature probe 200 may also include a shaft 208 extending between the flange 210 and the tip 202, e.g., as shown in FIG. 6. The shaft 208 may extend from the flange 210 partially towards the tip 202, whereby a portion of the sheath 206 is covered by the shaft 208 and a portion of the sheath 206 proximate the tip 202 is exposed. When the temperature probe 200 is fully inserted into the baking vessel 100 through the aperture 108, the shaft 208 extends through the aperture 108 towards the tip 202 of the temperature probe 200 while the flange 210 surrounds the aperture 108 and abuts the exterior surface 114 of the baking vessel 100. The flange 210 may comprise a resilient material. The shaft 208 may comprise a thermally insulative material. For example, the shaft 208 and the flange 210 may each comprise the same material, e.g., a resilient and thermally insulative material such as a rubber material, e.g., a silicone rubber. In such embodiments, the shaft 208 and the flange 210 may be unitary, e.g., may be formed of a one-piece, unitary and seamless construction.

In embodiments where the flange 210 comprises a resilient material, the flange 210 may sealingly engage the exterior surface 114 of the baking vessel 100 to sealingly enclose the aperture 108 when the temperature probe 200 is fully inserted into the baking vessel 100 through the aperture 108. Further, in embodiments where the baking vessel 100 comprises more than one aperture, e.g., a first aperture 108 and a second aperture 110, as illustrated in FIG. 5, the resilient material of the flange 210 may sealingly engage the exterior surface 114 of the baking vessel 100 to sealingly enclose both the first aperture 108 and the second aperture 110 when the temperature probe 200 is fully inserted into the baking vessel 100 through either one of the first aperture 108 and the second aperture 110.

The precision baking system 10 may also include features to help hold the temperature probe 200 in place when the temperature probe 200 is fully inserted into the baking vessel 100 through one of the apertures 108 or 110. For example, a high-temperature magnet 400 as in FIG. 2. As another example, a clip 300 may be provided, as shown in FIG. 5. One or both of the clip 300 and the magnet 400 may be provided in various combinations with features from any of the embodiments described herein. For example, the magnet 400 may be provided in a precision baking system 10 including a baking vessel 100 with one or more apertures 108 in the sidewall 106.

As shown in FIG. 2, the high-temperature magnet 400 may be positioned in the cylindrical cap 214 of the temperature probe 200. In other embodiments, as shown in FIG. 3, the high-temperature magnet 400 may be positioned in the flange 210. The high-temperature magnet 400 may be provided in any suitable location on or in the temperature probe 200 whereby the high-temperature magnet 400 engages the baking vessel 100 when the temperature probe 200 is fully inserted into the baking vessel 100 through one of the apertures 108 or 110.

Turning now to FIG. 5, clip 300 may include a first hook 302, a second hook 304, and a slot 306 extending between the first hook 302 and the second hook 304. As shown in FIG. 5, the first hook 302 and the second hook 304 of the clip 300 may be configured to engage the at least one sidewall 106 of the baking vessel 100. For example, the first hook 302 may engage a top of the sidewall 106 at an edge of the opening 104, and the second hook 304 may engage a bottom of the sidewall 106, e.g., at or near an intersection of the base wall 102 and the sidewall 106. The slot 306 of the clip 300 may be configured to engage the flange 210 of the temperature probe 200 when the temperature probe 200 is fully inserted into the baking vessel 100 through one of the apertures 108 or 110. For example, the slot 306 may extend to a bottom of the clip 300 so that the clip 300 is open, e.g., at the second hook 304. Thus, a user may insert the temperature probe 200 through a desired one of the apertures 108 or 110, then engage the first hook 302 of the clip 300 with the top of the sidewall 106, and then place the clip 300 over and around the temperature probe 200, whereby the flange 210 is positioned between the external surface 114 of the baking vessel 100 and the clip 300 with the distal portion 212 of the temperature probe 200 extending through the slot 306.

The temperature probe 200 may be configured for operative communication with an external device. The external device may be a controller of an oven appliance, a display of an oven appliance, a portable device such as a smart phone or smart watch, or a dedicated display. The temperature probe 200 may be in operative communication with such devices via a wired or wireless connection. The temperature probe 200 may be operable to send a signal to the external device, the signal representing or indicating one or more sensed temperature values from temperature sensor 204 of temperature probe 200. For example, in some embodiments, the temperature probe 200 may include a wireless transmitter 218. As another example, in some embodiments, the temperature probe 200 may include a wire 220 in operative communication with the temperature sensor 202. The wire 220 may extend between the flange 210 and a plug 222. The plug 222 may be configured to be received in a jack (not shown), e.g., of an oven appliance to transmit signals from the temperature sensor 202 to a controller of the oven appliance via the wire 220.

It should be appreciated that the present subject matter is not limited to any particular style, model, or configuration of baking vessel. The exemplary embodiment depicted in FIGS. 1 through 5 is simply provided for illustrative purposes only. For example, the baking vessel may include more than one sidewall, e.g., as in a square or rectangular pan, or a Bundt pan, and other differences may be applied as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A precision baking system, comprising:
a baking vessel defining a vertical direction, the baking vessel comprising a base wall and at least one sidewall;
a first aperture formed in the at least one sidewall of the baking vessel;
a second aperture formed in the at least one sidewall of the baking vessel, the second aperture spaced apart from the first aperture along the vertical direction; and
a temperature probe comprising a tip, a temperature sensor within the tip, a shaft, and a flange, the temperature probe removably inserted into the baking vessel through one of the first aperture and the second aperture such that the tip of the temperature probe is spaced from the base wall and the sidewall of the baking vessel with the shaft extending through the one of the first aperture and the second aperture towards the tip and the flange surrounding the first aperture and the second aperture and abutting an exterior surface of the baking vessel, wherein the flange comprises a resilient material and the resilient material of the flange sealingly engages the exterior surface of the baking vessel to sealingly enclose the first aperture and the second aperture.

2. The precision baking system of claim 1, wherein the temperature probe is sized such that the tip of the temperature probe is proximate a geometric center of the baking vessel.

3. The precision baking system of claim 1, wherein the baking vessel defines a cooking volume and the first aperture and the second aperture are the only penetrations through the base wall and the at least one sidewall into the cooking volume, whereby the cooking volume is enclosed by the at least one sidewall as a result of the resilient material of the flange sealingly engaging the exterior surface of the baking vessel to sealingly enclose the first aperture and the second aperture.

4. The precision baking system of claim 1, further comprising a clip, the clip comprising a first hook, a second hook, and a slot extending between the first hook and the second hook, the first hook and the second hook of the clip configured to engage the at least one sidewall of the baking vessel, and the slot of the clip configured to engage the flange of the temperature probe.

5. The precision baking system of claim 1, wherein the temperature probe further comprises a magnet positioned on the temperature probe and the magnet engages the baking vessel.

* * * * *